3,418,269
STRESS-CRACK RESISTANT POLYETHYLENE
COMPOSITIONS
George L. Bata, Montreal, Quebec, Canada, assignor to
Union Carbide Canada Limited, Toronto, Ontario, Canada, a corporation of Canada
No Drawing. Continuation of application Ser. No.
334,026, Dec. 27, 1963. This application Nov. 17,
1966, Ser. No. 595,266
10 Claims. (Cl. 260—38)

This application is a continuation of the application of George L. Bata, Ser. No. 334,026, filed Dec. 27, 1963, now abandoned, for Stress-Crack Resistant Polyethylene Compositions.

This invention relates to improved stress-crack resistant polyethylene compositions, and to a method for preparing them.

In British Patent 877,128 it is disclosed that the stress-cracking resistance of a normally solid polyethylene can be unexpectedly increased by incorporating into the polyethylene a relatively small amount of a drying oil-soluble resinous condensation product of a phenol and an aliphatic aldehyde, together with either a pigmenting amount of carbon black or a stabilizing amount of an antioxidant for the polyethylene, or a mixture thereof. However, such compositions are characteristically quite tacky, making them unattractive for many commercial applications. The instant invention provides a means for decreasing the inherent tackiness of such compositions.

The improved tackless compositions of the instant invention are prepared by incorporating a minor amount of hexamethylenetetramine into the polyethylene compositions described in British Patent 877,128. The hexamethylenetetramine can be incorporated into the polyethylene along with the other additives employed in the manner described in the British patent, i.e., by heating the polyethylene to a fluid plastic state while mixing with the additives, for example, by subjecting the polyethylene to the action of a heated Banbury mixer, or heated mixing rolls, or heated extruders, whereby the additives readily disperse homogeneously in the melted polyethylene.

The hexamethylenetetramine is preferably incorporated into the polyethylene as an aqueous solution or slurry. The solution or slurry suitably contains from 40 percent by weight to 90 percent by weight, preferably from 70 percent by weight to 80 percent by weight, of hexamethylenetetramine, based on the total weight of the hexamethylenetetramine and water. However, whether the hexamethylenetetramine is added to the polyethylene directly, or as a solution or slurry, it should be added in an amount of from 0.05 percent by weight to 6.0 percent by weight, preferably from 0.1 percent by weight to 0.5 percent by weight, based on the weight of the polyethylene.

The polyethylene compositions described in British Patent 877,128 contain from 1.5 percent by weight to 12 percent by weight, preferably from 3 percent by weight to 6 percent by weight, of a drying oil-soluble resinous condensation product of a phenol and an aliphatic aldehyde, based on the weight of polyethylene. Such resins are the alkaline or acid catalyzed condensation products of a saturated aliphatic aldehyde, particularly formaldehyde or its polymer, e.g., paraformaldehyde, and an alkyl or aryl ortho- or para-substituted phenol as exemplified by the cresols, xylenols, ortho- or para-tertiary-butylphenol, ortho- or para-tertiary-amylphenol, sec-octylphenols, ortho- or para-cyclohexylphenyl, and ortho- or para-phenylphenol. These resins, and methods for producing them, are more fully described in the references cited in British Patent 877,128.

The polyethylene compositions described in British Patent 877,128 can contain from as little as 0.001 percent by weight to as much as 5 percent by weight, preferably from 0.025 percent by weight to 0.1 percent by weight, of a suitable antioxidant, based on the weight of polyethylene. Suitable antioxidants are described in the British patent and the references cited therein.

The carbon black used as co-additive in the polyethylene compositions described in British Patent 877,128 includes any of the common blacks, such as acetylene, channel, or lamp black. From 1 percent by weight to 6 percent by weight of carbon black is ordinarily required in the complete polyethylene composition.

The following examples are set forth for purposes of illustration so that those skilled in the art may better understand this invention and it should be understood that they are not to be construed as limiting this invention in any maner.

Example 1

A normally solid polyethylene (density=0.920 g./cc., melt index=0.15 dg./min.) was hot compounded in a Banbury mixer at a temperature of 140° C. for 5 minutes with 3 percent by weight of carbon black, 5 percent by weight of a commercial acid catalyzed, drying oil-soluble, resinous condensation product of para-tertiary-amylphenol and formaldehyde (softening point=88–99° C., specific gravity=1.055 at 20° C.), and 0.13 percent by weight of an aqueous solution of hexamethylenetertamine having a hexamethylenetetramine concentration of 75 percent by weight. This produced a composition having a hexamethylenetetramine concentration of 0.1 percent by weight, based on the weight of the polyethylene. The cooled composition was much less tacky than a composition prepared in the identical manner but without the hexamethylenetetramine solution.

When the procedure was repeated in a similar manner so that compositions having a hexamethylenetetramine concentration of 0.3 percent by weight and 0.5 percent by weight, respectively, were obtained, similar improvements in tackiness were observed.

Example 2

Eighty-seven and three-tenths (87.3) parts by weight of a normally solid polyethylene (density=0.9195 g./cc., melt index=0.14 dg./min.) was hot compounded in a Banbury mixer at a temperature of 140° C. for 5 minutes with 2.7 parts by weight of carbon black, 5 parts by weight of a commercial acid catalyzed, drying oil-soluble, resinous condensation product of para-tertiary-amylphenol and formaldehyde (softening point=88–99° C., specific gravity=1.055 at 20° C.), and 5 parts by weight of hexamethylenetetramine. The cooled composition was much less tacky than a composition prepared in the identical manner but without the hexamethylenetetramine.

It is requested that the application papers, excepting the claims, of the original application be used in this application.

I claim:
1. In a process for preparing a polyethylene composition which comprises mixing a normally solid polyethylene at a temperature of between 115° C. and, 150° C. with from 1.5 percent to 12 percent by weight of said polyethylene of a drying oil-soluble resinous condensation product of a phenol and an aliphatic aldehyde and from one percent to six percent by weight of said polyethylene of an additive consisting of at least one selected from the group consisting of carbon black and an antioxidant for polyethylene, the improvement which comprises also incorporating from 0.05 percent to 6 percent by weight of hexamethylenetetramine based on the weight of polyethylene, so as to decrease the tackiness of the resulting composition.

2. A process as in claim 1, wherein said additive is carbon black.

3. A process as in claim 1, wherein said resinous condensation product is present in from 3 to 6 percent by weight of said polyethylene and said hexamethylenetetramine is present from 0.1 percent to 0.5 percent by weight of said polyethylene.

4. A process as in claim 1 wherein the hexamethylenetetramine is added as an aqueous solution having a hexamethylene tetramine concentration of approximately 75 percent.

5. In a process for preparing a polyethylene composition which comprises mixing polyethylene of a density of approximately 0.920 g./cc. and a melt index of 0.15 dg./min. at a temperature of approximately 140° C. with approximately 5 percent by weight of an acid catalyzed drying oil-soluble resinous condensation product of paratertiary-amyl phenol and formaldehyde and approximately 3 percent by weight of carbon black, the improvement which comprises adding approximately 0.13 percent of an aqueous solution of hexamethylenetetramine having a hexamethylenetetramine concentration of approximately 75 percent by weight.

6. A polyethylene composition comprising normally solid polyethylene in admixture with 1.5 percent to 12 percent by weight of said polyethylene of a drying oil-soluble resinous condensation product of a phenol and an aliphatic aldehyde, from one percent to six percent by weight of said polyethylene of an additive consisting of at least one selected from the group consisting of carbon black and an anti-oxidant for polyethylene, and from 0.05 percent to 6 percent by weight of hexamethylenetetramine based on the weight of polyethylene so as to decrease the tackiness of the resulting composition.

7. A polyethylene composition as in claim 6, wherein the resinous condensation product is present in from 3 percent to 6 percent by weight of said polyethylene and said hexamethylene is present from 0.1 percent to 0.5 percent by weight of said polyethylene.

8. A polyethylene composition as in claim 6 wherein said resinous condensation product is an acid catalyzed drying oil-soluble resinous condensation product of paratertiary-amylphenol and formaldehyde.

9. A polyethylene composition as in claim 6 wherein the said normally solid polyethylene is polyethylene of a density of approximately 0.920 g./cc. and a melt index of 0.15 dg./min.

10. A polyethylene composition as in claim 6 wherein the said additive is carbon black.

References Cited

UNITED STATES PATENTS

| | | | |
|---|---|---|---|
| 3,296,333 | 1/1967 | White | 260—848 |
| 3,234,176 | 2/1966 | Bata et al. | 260—38 |
| 3,157,628 | 11/1964 | Hill et al. | 260—848 |
| 2,875,179 | 2/1959 | Freeman | 260—40 |

FOREIGN PATENTS 877,128  9/1961  Great Britain.

OTHER REFERENCES

Stille, Introduction to Polymer Chemistry, pp. 102–103 relied upon.

John Wiley & Sons, Inc., New York (1962). Group 145 QD281 P657 C. 2.

MORRIS LIEBMAN, *Primary Examiner.*

R. S. BARON, *Assistant Examiner.*

U.S. Cl. X.R.

260—884